United States Patent
Kelrich et al.

(10) Patent No.: US 6,648,032 B1
(45) Date of Patent: Nov. 18, 2003

(54) APPARATUS AND METHOD FOR FACILITATING FUELING A VEHICLE

(75) Inventors: David Kelrich, Ramat Hasharon (IL); Hayim Kohen, Herzeliya (IL)

(73) Assignee: Orpak Industries (1983) Ltd., Bnei Brak (IL)

( * ) Notice: Subject to any disclaimer, the term of this patent is extended or adjusted under 35 U.S.C. 154(b) by 0 days.

(21) Appl. No.: 10/167,570

(22) Filed: Jun. 13, 2002

(51) Int. Cl.$^7$ ................................................. B65B 1/30
(52) U.S. Cl. ................. 141/94; 141/1; 141/98; 141/206; 141/382
(58) Field of Search ................. 141/1, 94, 98, 141/206, 231, 382, 392

(56) References Cited

U.S. PATENT DOCUMENTS

| | | | |
|---|---|---|---|
| 5,297,594 A | * | 3/1994 | Rabinovich ............ 141/59 |
| 5,857,501 A | | 1/1999 | Kelerich et al. |
| 5,971,040 A | | 10/1999 | McFarland et al. |
| 5,975,165 A | | 11/1999 | Motosugi et al. |
| 5,992,474 A | | 11/1999 | Miller |
| 6,085,805 A | | 7/2000 | Bates |
| 6,112,782 A | | 9/2000 | Farthing |
| 6,250,347 B1 | | 6/2001 | Tatsuno |
| 6,253,802 B1 | | 7/2001 | Enge |
| 6,276,407 B1 | | 8/2001 | Corfitsen |

FOREIGN PATENT DOCUMENTS

WO     WO 99/36887     7/1999

* cited by examiner

Primary Examiner—Gregory L. Huson
Assistant Examiner—Peter deVore
(74) Attorney, Agent, or Firm—Oblon, Spivak, McClelland, Maier & Neustadt, P.C.

(57) ABSTRACT

A controlled fuel distribution system and method for use in a vehicle fuel filling facility, including at least one fuel pump having a nozzle and at least one nozzle-mounted transceiver for receiving information from a vehicle prior to discharge of fuel thereinto and communicating with an authorization subsystem located at the vehicle fuel filling facility, and a fuel flow driven transceiver power generator operated by fuel pumped by the at least one fuel pump and passing through the nozzle for powering the at least one nozzle-mounted transceiver.

20 Claims, 3 Drawing Sheets

APPARATUS AND METHOD FOR FACILITATING FUELING A VEHICLE

FIELD OF THE INVENTION

The present invention relates to fueling systems generally and more particularly to automated fueling systems.

BACKGROUND OF THE INVENTION

The following U.S. Patents are believed to represent the current state of the art; U.S. Pat. Nos. 6,276,407; 6,253,802; 6,250,347; 6,112,782; 6,085,805; 5,992,474; and 5,971,040.

The following U.S. Patent and patent application of the application/assignee also relate to the general field of the invention, the disclosures of which are hereby incorporated by reference: U.S. Pat. No. 5,857,501 and U.S. patent application Ser. No. 09/600,428.

SUMMARY OF THE INVENTION

The present invention seeks to provide an improved fuel distribution system and apparatus for use therein.

There is thus provided, in accordance with a preferred embodiment of the present invention, a controlled fuel distribution system for use in a vehicle fuel filling facility including:

at least one fuel pump having a nozzle;

at least one nozzle-mounted transceiver for receiving information from a vehicle prior to discharge of fuel thereinto and communicating with an authorization subsystem located at the vehicle fuel filling facility, and a fuel flow driven transceiver power generator operated by fuel pumped by the at least one fuel pump and passing through the nozzle for providing electrical power to the at least one nozzle-mounted transceiver.

There is additionally provided in accordance with a preferred embodiment of the present invention, a controlled fuel distribution method for use in a vehicle fuel filling facility including at least one fuel pump having a nozzle and at least one nozzle-mounted transceiver, the method including:

receiving information from a vehicle prior to discharge of fuel thereinto;

communicating with an authorization subsystem located at the vehicle fuel filling facility, and driving a fuel flow driven transceiver power generator by a flow of fuel pumped by the at least one fuel pump and passing through the nozzle to provide electrical power for powering the at least one nozzle-mounted transceiver.

Additionally in accordance with a preferred embodiment of the present invention there is provided for use in a controlled fuel distribution system in a vehicle fuel filling facility including at least one fuel pump having a nozzle and at least one nozzle-mounted transceiver for receiving information from a vehicle prior to discharge of fuel thereinto and communicating with an authorization subsystem located at the vehicle fuel filling facility, a fuel flow driven transceiver power generator operated by fuel pumped by the at least one fuel pump and passing through the nozzle for powering the at least one nozzle-mounted transceiver.

In accordance with a preferred embodiment of the present invention, the fuel flow driven transceiver power generator includes an impeller located upstream of the nozzle.

Preferably, the nozzle-mounted transceiver and the fuel flow driven transceiver power generator are located together within a single housing threadably connected at one end to a fuel supply hose leading from the fuel pump and at an opposite end to the nozzle.

In accordance with a preferred embodiment of the present invention, the nozzle-mounted transceiver includes a first nozzle-mounted transceiver for communication with the vehicle and a second nozzle-mounted transceiver for communication with the authorization subsystem.

Preferably, the nozzle-mounted transceiver includes a battery for storing electrical power generated by the impeller and for supplying the electrical power to the at least one nozzle-mounted transceiver.

In accordance with a preferred embodiment of the present invention, the impeller also provides an indication of fuel flow through the nozzle.

The indication of fluid flow preferably is employed to confirm proper operation of the fuel distribution system.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
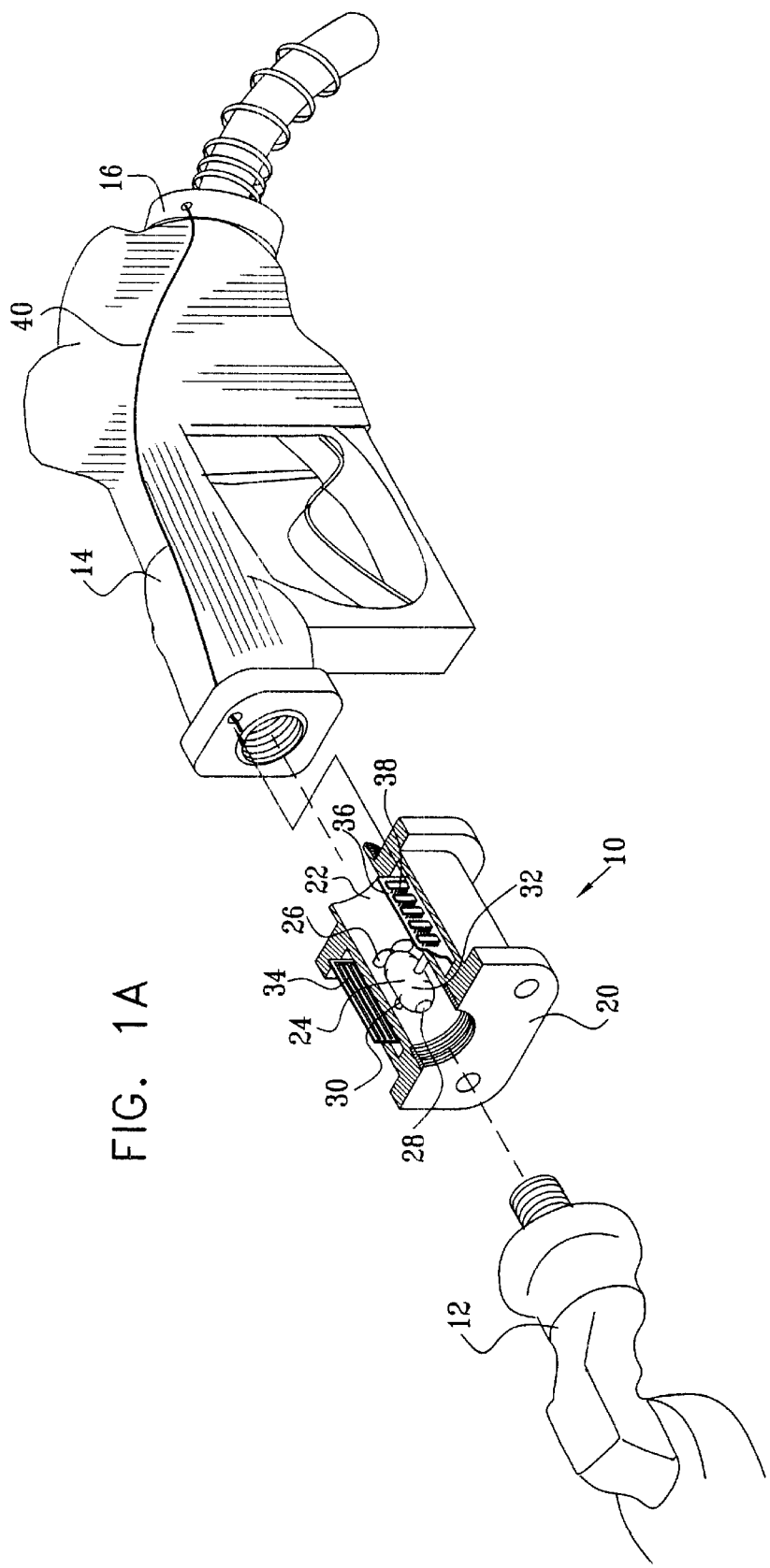
FIGS. 1A and 1B are respective exploded view and assembled view illustrations of a portion of a controlled fuel distribution system for use in a vehicle fuel filling facility in accordance with a preferred embodiment of the present invention.
Figure 1B:
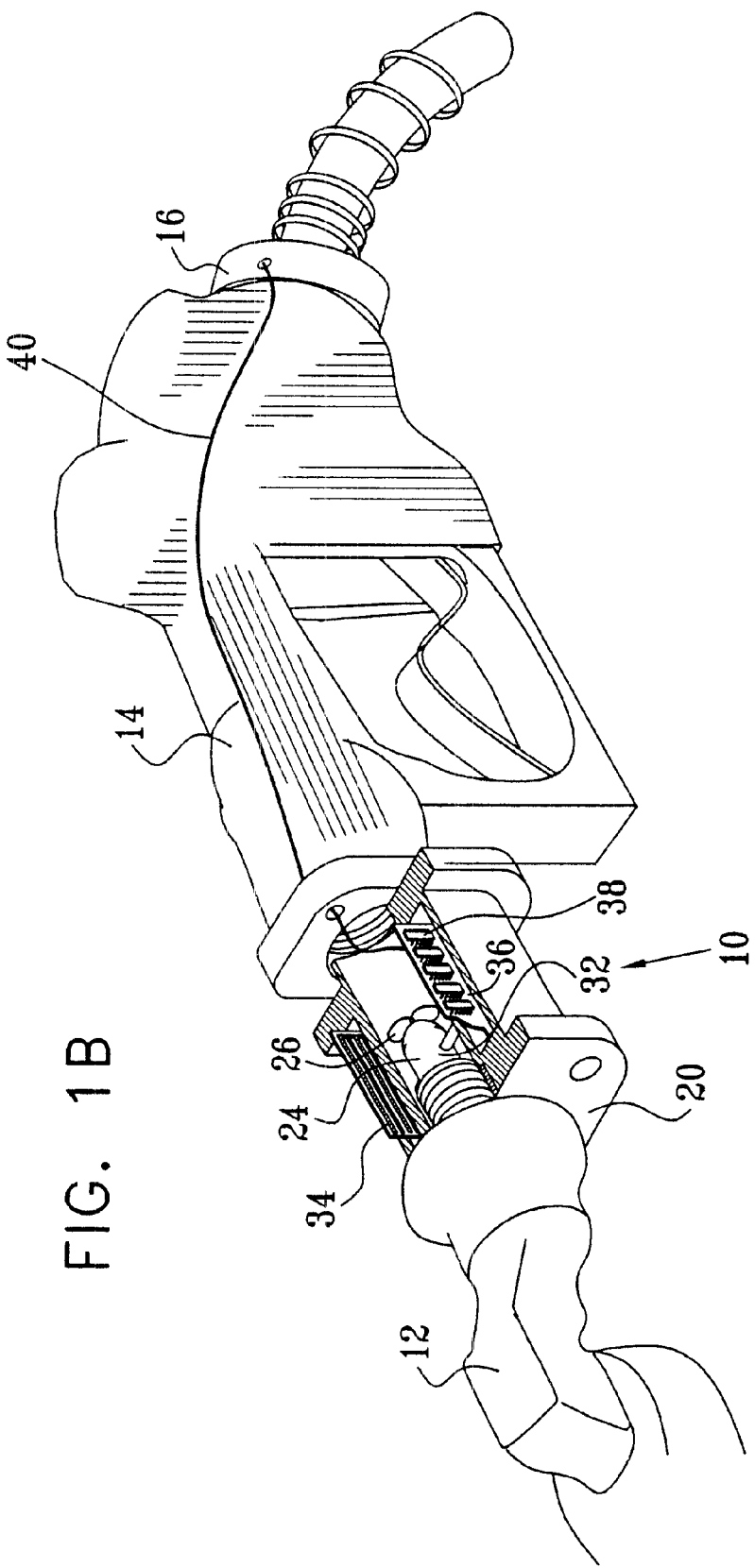

Reference is now made to FIGS. 1A and 1B, which are respective exploded view and assembled view illustrations of a portion of a controlled fuel distribution system for use in a vehicle fuel filling facility in accordance with a preferred embodiment of the present invention.

As seen in FIGS. 1A and 1B, in accordance with a preferred embodiment of the present invention, a fuel, driven power generation module 10 is connected in series between a conventional fuel delivery hose connector 12 and a conventional fuel delivery nozzle 14. In accordance with another embodiment of the present invention, the fuel driven power generation module 10 may be located further upstream in the fuel delivery system, typically between the fuel delivery pump and the fuel delivery hose or any other suitable location.

In accordance with a preferred embodiment of the present invention, there is mounted on fuel delivery nozzle 14 a transceiver 16 which preferably communicates wirelessly with a vehicle mounted transceiver (not shown) and obtains therefrom vehicle identification data which is employed for authorizing fuel delivery to the vehicle. Fuel delivery systems employing nozzle mounted transceivers which communicate with vehicle fuel fill pipe mounted transceivers are commercially available from the applicant assignee under the trade names FuelOmat and FuelOpass and are described inter alia in U.S. Pat. No. 5,857,501 and U.S. patent application Ser. No. 09/600,428, the disclosures of which are hereby incorporated by reference.

In accordance with a preferred embodiment of the present invention the fuel driven power generation module 10 comprises a housing 20 which defines a fuel flow channel 22. A fuel flow driven turbine 24 is preferably mounted in fuel flow channel 22 and preferably includes a turbine blade assembly 26 which rotates about an axle 28, which preferably lies along a longitudinal flow axis 30 of fuel flow channel 22.

The rotation of turbine blade assembly 26 is preferably produced by the flow of fuel along channel 22 and drives an electrical generator 32, which preferably supplies electricity to an electrical storage device, such as a battery 34. Electrical circuitry 36 is preferably powered by battery 34 and may also be powered directed by generator 32.

Electrical circuitry 36 preferably also includes a transceiver 38 which preferably communicates wirelessly with a fuel delivery system transceiver (not shown), which preferably is located on the premises of a filling station and which serves multiple fuel pumps. Electrical circuitry 36 preferably communicates with transceiver 16 and preferably provides electrical power thereto via a power connection wire 40. Alternatively, transceiver 16 may receive electrical power by induction from a vehicle mounted electrical power source or may have an independent power source.

Information communication between transceivers 16 and 38 may be wired or wireless. If wired communication is employed, such communication may be provided over power connection wire 40. Transceivers 16 and 38 are both referred to herein as nozzle mounted transceivers. Alternatively, a greater or lesser number of transceivers may be employed.

Figure 2:
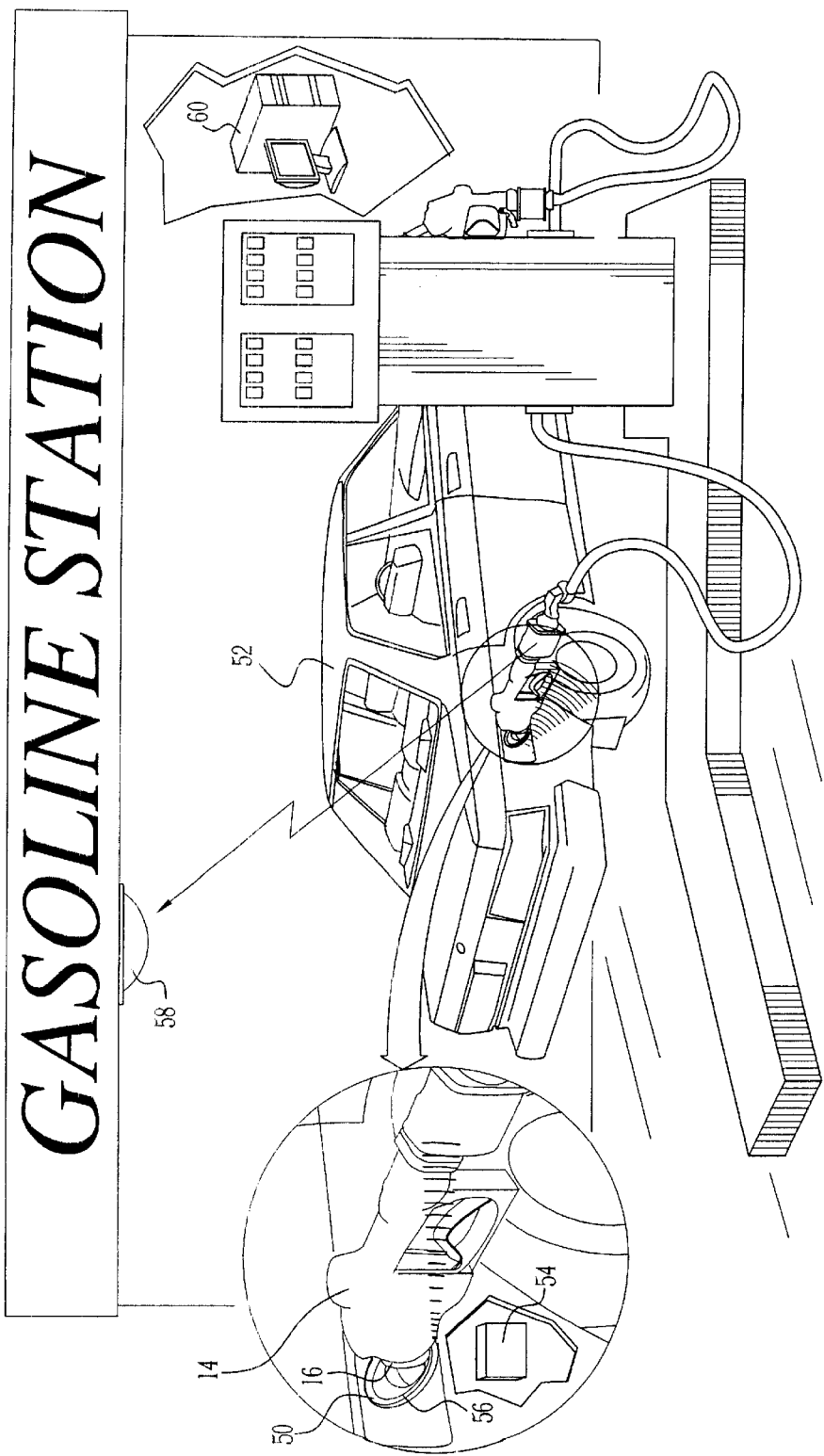
FIG. 2 is a simplified illustration of a controlled fuel distribution system for use in a vehicle fuel filling facility in accordance with a preferred embodiment of the present invention.

Reference is now made to FIG. 2, which is a simplified illustration of a controlled fuel distribution system for use in a vehicle fuel filling facility in accordance with a preferred embodiment of the present invention. In the system shown in FIG. 2, a fuel delivery nozzle 14 is shown inserted into the fuel fill pipe 50 of a vehicle 52. Wireless communication from a transceiver 54 located in the vehicle, preferably including an antenna 56 in the vicinity of the fuel fill pipe, may be received by a transceiver 16 mounted on nozzle 14 and retransmitted wirelessly to transceiver 38 (FIG. 1A). Alternatively, transceiver 16 may be obviated and wireless communication may take place directly between vehicle mounted transceiver 54 and transceiver 38 (FIG. 1A).

As seen in FIG. 2, transceiver 38 (FIG. 1A) preferably communicates information, such as vehicle identification and fueling data with a central transceiver 58, which serves multiple fuel pumps. An authorization subsystem 60, preferably located at the vehicle fuel filling facility, preferably communicates with central transceiver 58 and is operative to permit fueling of authorized vehicles. It is appreciated that the communication is preferably bi-directional, although unidirectional communication may be employed where appropriate.

Typically, such communication takes place both before and following fueling of a vehicle. During the fueling, electrical power is generated by the flow of fuel pumped to the vehicle. This electrical power is employed for at least part of the communication. It is a particular feature of the present invention, that generation of electrical power for the nozzle mounted transceivers at the nozzle avoids the need to transmit electrical power by wire in a very challenging environment in which flammable and explosive fumes are present and wherein mechanical robustness is required.

It will be appreciated by persons skilled in the art that the present invention is not limited by what has been particularly shown and described hereinabove. Rather the scope of the present invention includes both combinations and sub-combinations of the various features described hereinabove as well as modifications and variations thereof which would occur to persons skilled in he art upon reading the description and which are not in the prior art.

What is claimed is:

1. A controlled fuel distribution system for use in a vehicle fuel filling facility comprising:
    at least one fuel pump having a nozzle;
    at least one nozzle-mounted transceiver for receiving information from a vehicle prior to discharge of fuel thereinto and communicating with an authorization subsystem located at said vehicle fuel filling facility; and
    a fuel flow driven transceiver power generator operated by fuel pumped by said at least one fuel pump and passing through said nozzle, thereby providing electrical power for powering said at least one nozzle-mounted transceiver.

2. A controlled fuel distribution system according to claim 1 and wherein said fuel flow driven transceiver power generator comprises an impeller located upstream of said nozzle.

3. A controlled fuel distribution system according to claim 2 and wherein said at least one nozzle-mounted transceiver comprises a battery for storing electrical power generated by said impeller and for supplying said electrical power to said at least one nozzle-mounted transceiver.

4. A controlled fuel distribution system according to claim 2 and wherein said impeller also provides an indication of fuel flow through said nozzle.

5. A controlled fuel distribution system according to claim 4 and wherein said indication of fluid flow is employed to confirm proper operation of said fuel distribution system.

6. A controlled fuel distribution system according to claim 2 and wherein said at least one nozzle-mounted transceiver comprises a first nozzle-mounted transceiver for communication with said vehicle and a second nozzle-mounted transceiver for communication with said authorization subsystem.

7. A controlled fuel distribution system according to claim 1 and wherein said at least one nozzle-mounted transceiver and said fuel flow driven transceiver power generator are located together within a single housing threadably connected at one end to a fuel supply hose leading from said fuel pump and at an opposite end to said nozzle.

8. A controlled fuel distribution system according to claim 1 and wherein said at least one nozzle-mounted transceiver comprises a first nozzle-mounted transceiver for communication with said vehicle and a second nozzle-mounted transceiver for communication with said authorization subsystem.

9. A controlled fuel distribution system according to claim 1 and wherein said at least one nozzle-mounted transceiver comprises a nozzle-mounted transceiver for communication with said vehicle and with said authorization subsystem.

10. A controlled fuel distribution system according to claim 1 and also comprising a battery for storing electrical power generated by said generator and for supplying said electrical power to said at least one nozzle-mounted transceiver.

11. A controlled fuel distribution method for use in a vehicle fuel filling facility including at least one fuel pump having a nozzle and at least one nozzle-mounted transceiver, the method including:
    receiving information from a vehicle prior to discharge of fuel thereinto;
    communicating with an authorization subsystem located at the vehicle fuel filling facility; and driving a fuel flow driven transceiver power generator by a flow of fuel pumped by said at least one fuel pump and passing through said nozzle to provide electrical power for powering said at least one nozzle-mounted transceiver.

12. A controlled fuel distribution method according to claim 11 and wherein said fuel flow driven transceiver power generator comprises an impeller located upstream of said nozzle.

13. A controlled fuel distribution method according to claim 12 and wherein said at least one nozzle-mounted transceiver comprises a battery for storing electrical power generated by said impeller and for supplying said electrical power to said at least one nozzle-mounted transceiver.

14. A controlled fuel distribution method according to claim 12 and wherein said impeller also provides an indication of fuel flow through said nozzle.

15. A controlled fuel distribution method according to claim 14 and wherein said indication of fluid flow is employed to confirm proper operation of said fuel distribution method.

16. A controlled fuel distribution method according to claim 12 and wherein said at least one nozzle-mounted transceiver comprises a first nozzle-mounted transceiver for communication with said vehicle and a second nozzle-mounted transceiver for communication with said authorization subsystem.

17. A controlled fuel distribution method according to claim 11 and wherein said at least one nozzle-mounted transceiver and said fuel flow driven transceiver power generator are located together within a single housing threadably connected at one end to a fuel supply hose leading from said fuel pump and at an opposite end to said nozzle.

18. A controlled fuel distribution method according to claim 11 and wherein said at least one nozzle-mounted transceiver comprises a first nozzle-mounted transceiver for communication with said vehicle and a second nozzle-mounted transceiver for communication with said authorization subsystem.

19. A controlled fuel distribution method according to claim 11 and wherein said at least one nozzle-mounted transceiver comprises a nozzle-mounted transceiver for communication with said vehicle and with said authorization subsystem.

20. A controlled fuel distribution method according to claim 11 and also comprising a battery for storing electrical power generated by said generator and for supplying said electrical power to said at least one nozzle-mounted transceiver.

* * * * *